United States Patent [19]
Burgdorf et al.

[11] Patent Number: 4,657,312
[45] Date of Patent: Apr. 14, 1987

[54] SLIP-CONTROLLED BRAKE SYSTEM FOR MOTOR VEHICLES

[75] Inventors: Jochen Burgdorf, Offenbach-Pumpenheim; Lutz Weise, Mainz, both of Fed. Rep. of Germany

[73] Assignee: Alfred Teves GmbH, Frankfurt am Main, Fed. Rep. of Germany

[21] Appl. No.: 734,856

[22] Filed: May 15, 1985

[30] Foreign Application Priority Data

May 15, 1984 [DE] Fed. Rep. of Germany ....... 3418043

[51] Int. Cl.$^4$ .............................................. B60T 17/18
[52] U.S. Cl. ........................................ 303/92; 60/534
[58] Field of Search ...................... 60/534, 535; 91/1; 92/5 R; 116/283; 303/92, 114

[56] References Cited

U.S. PATENT DOCUMENTS

| | | | |
|---|---|---|---|
| 4,143,514 | 3/1979 | Leiber | 60/534 |
| 4,176,586 | 12/1979 | Stoll et al. | 92/5 R |
| 4,478,461 | 10/1984 | Leiber | 303/92 |
| 4,489,555 | 12/1984 | Leiber | 60/534 |
| 4,523,791 | 6/1985 | Belart et al. | 303/92 |

Primary Examiner—Duane A. Reger
Attorney, Agent, or Firm—James B. Raden; William J. Michals

[57] ABSTRACT

A slip-controlled brake system for motor vehicles is provided with at least one static brake circuit (17, 18) into which, in the event of control, pressure medium can be fed from a dynamic pressure medium circuit through a control valve. The system comprises a brake pressure generator (1) including a master cylinder arrangement (12) and a positioning sleeve (33) maintaining the master cylinder piston or pistons (42, 43) in a defined position during the dynamically controlled inflow of pressue medium. The brake system is furnished with a monitoring means (39, 40, WU) to detect the path and the relative position of the positioning sleeve (33), respectively, in the master cylinder arrangement (12) and to evaluate the same as a signal indicative of the proper operation of the brake system. The path sensor (39) detecting the position of the positioning sleeve (33) is capable to mechanically or electrically open a contact (39) feasibly closed in the resting position to thereby release a signal.

7 Claims, 1 Drawing Figure

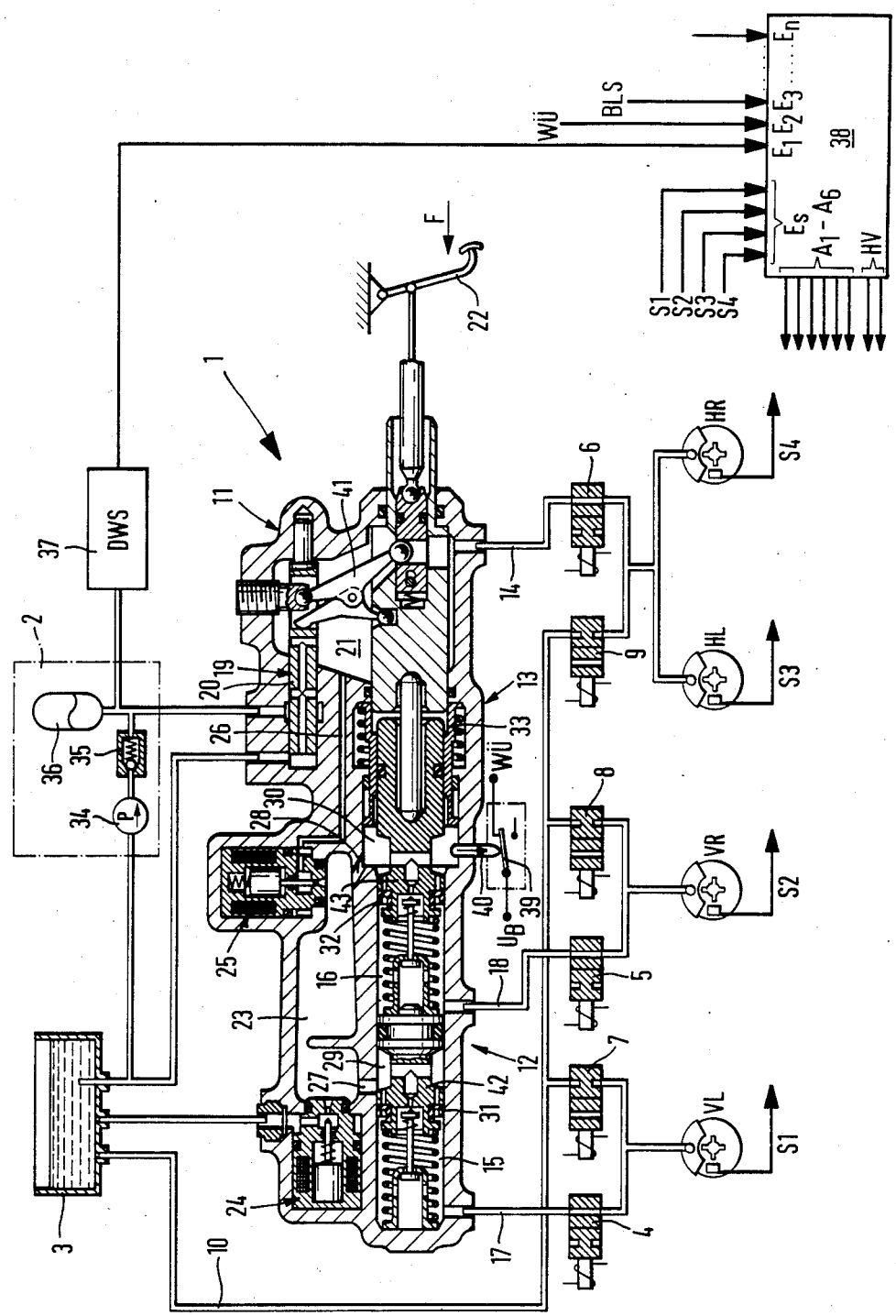

SLIP-CONTROLLED BRAKE SYSTEM FOR MOTOR VEHICLES

BACKGROUND OF THE INVENTION

The present invention relates to a slip-controlled brake system for motor vehicles, comprising at least one static brake circuit into which, in the event of control such as during a controlled braking operation, pressure medium from a dynamic pressure medium circuit is suitably fed through a control valve. The system comprising a brake pressure generator including a master cylinder arrangement and a positioning means which, during the dynamically controlled inflow of pressure medium into the static brake circuit, can be set back against the brake pedal force to thereby maintain the master cylinder piston in a defined position.

Monitoring of slip-controlled brake systems for their proper operation, for safety reasons, is of utmost importance because, in the event of a failure caused by a partial shut-down or a complete cut-off of the control — depending on the type of error and on the brake system — it is imperative to nevertheless permit at least an uncontrolled deceleration of the motor vehicle. A defective brake slip control could result in a complete removal of the brake pressure in the wheel brakes which, in the majority of situations, will be more dangerous than locking of one or more of the motor vehicle wheels.

In a conventional monitoring device designed for antilocking brake systems for motor vehicles, the pressure of the servo source is monitored and in the event of a decrease in the said pressure the brake slip control is turned off as soon as a controlled brake operation already initiated has been completed (DE-PS No. 24 11 173).

As the pressure monitoring control is disposed in the supply source, defects in the brake pressure generator affecting the operation of the system cannot be detected despite adequate operating pressure.

Moreover, it is known in the art to detect in a brake system of the afore-mentioned type the hydraulic pressure prevailing at the same time at various points in the interior of the brake pressure generator and to compare the pressure levels with one another in order to include in the monitoring operation both the energy supply system and components of the brake pressure generator (for example, the hydraulic brake force booster) the master valves for the dynamically controlled inflow of pressure medium into the static circuits etc. (DE-OS No. 32 32 052). Upon detection of a defect, the system will be partly shut down in that only the pressure decrease and the dynamic inflow into the static circuits is locked or, depending on the type of defect, the brake slip control will be completely cut off (DE-OS No. 32 32 051). In these prior art brake systems component errors which are not detected by monitoring are likely to occur.

It is, therefore, the object of the present invention to further improve the safety and reliability of a slip-controlled brake system and to develop a system in which errors or defects of individual components heretofore not recognizable can be detected and automatically result in a partial shut-down or cut-off of the brake slip control thereby safeguarding that the motor vehicle can still be decelerated despite the defect occurred and in an effective though uncontrolled manner or by restriction of the control function to some of the wheels.

SUMMARY OF THE INVENTION

This object is achieved by means of a slip-controlled brake system of the afore-mentioned type, the improvement of which resides in that the brake system is provided with a monitoring means suitable for detecting the relative position and/or the change in position of the positioning means of parts thereof in the master cylinder arrangement and to evaluate the same as a signal indicative of the proper operation of the brake system.

According to an advantageous embodiment of the invention the essential component of the positioning means is a positioning sleeve axially displaceable in the direction of movement of the master cylinder piston, the position of which sleeve in the master cylinder arrangement is detectable by means of one or several path sensors. Hence, the reserve stroke of the positioning means and the positioning sleeve, respectively, is directly monitored by the monitoring system of the present invention. All components in the path of the dynamically controlled inflow inclusive of the master valves, of necessity, are equally controlled. As opposed to a pressure supervision within the brake pressure generator, the level of the valve controlled pressure medium inflow at high and low frictional values can vary considerably. Monitoring of the reserve stroke of the master cylinder piston and, hence, of the hydraulic volume still available for the actual control, will be done in the static brake circuits.

According to another embodiment of the present invention, the path sensors are formed as mechanically operable end or positioning switches mechanically or electrically coupled to an electrical contact closed in the resting position and in the event of a proper operation of the brake system. The path sensors, conversely, can also be formed as electrical, preferably inductive, electromagnetic or capacitive position metering means.

According to another advantageous embodiment of the present invention, the signals of the monitoring means are logically coupled to the start signals of the brake slip control. In one case it puts the monitoring means into operation only in case of a dynamically controlled inflow of pressure medium and during the brake slip control, respectively. In the event of a failure, according to another embodiment of the invention, the brake slip control is automatically shut down in part (for example, by locking the pressure decrease either in all or only in the static brake circuits) or is cut off completely in response to the relative position of the positioning sleeve in the master cylinder arrangement as indicated by the monitoring means.

BRIEF DESCRIPTION OF THE DRAWING

Various other objects, features and attendant advantages of the invention will be more fully understood from the following description when taken in conjunction with the accompanying drawing the single FIGURE of which illustrates the brake system in accordance with the present invention.

DETAILED DESCRIPTION

As illustrated in the drawing, the brake system according to the present invention, substantially comprises a pedal-operated elongated hydraulic brake pressure generator generally designated by reference numeral 1, an auxiliary pressure source 2, a supply and pressure tank 3 and electromagnetically operable 2,2-way valves 4–6, by way of which the wheel brakes and the front and rear wheels VR, VL, HR and HL, respectively, are connected in three hydraulically separate brake circuits. Valves 4–6, normally, i.e., as long as they are in non-energized condition, are switched to passage position. Moreover, a return conduit 10 leading from the front and from the rear wheels VR, VL, HR, HL to the supply tank 3 is provided which, however, with the aid of three further 2/2 way valves 7–9 is separated from the wheel brake cylinders as long as valves 7–9 are in the non-energized condition. Brake pressure generator 1, in turn, comprise a hydraulic brake force booster 11, a master cylinder arrangement 12 and a positioning means 13.

Directly connected to brake force booster 11 is the rear wheel brake circuit 14, whereas the two working chambers 15 and 16 of the master cylinder arrangement 12 (in that instance formed as tandem master cylinders) are respectively connected to a front wheel VR and VL by way of separate brake circuits 17 and 18. The two master cylinder circuits of such an arrangement are called static pressure medium circuits, whereas the real axle circuit is called dynamic pressure medium circuit because in the said circuit 14 the pressure is determined by the position of a control valve 19 pedal-operated by way of rod 41 which, depending on the displacement of a valve piston 20, permits more or less pressure to flow from the auxiliary energy source 2 into the booster chamber 21 and from here into the brake circuit 14.

The pressure built up during actuation of a brake pedal 22 in the booster chamber 21 and fed in controlled form through control valve 19, respectively, at the same time will act upon pistons 42,43 of the master cylinder arrangement 12 resulting, as is readily understood, in the build-up of a brake pressure in working chambers 15 and 16 of the two static brake circuits 17, 18 leading to the front wheels VR and VL. In a pre-working chamber 23 of the master cylinder arrangement 12, first atmospheric pressure will prevail because the said chamber, by way of a so-called master valve 24, in the resting position, in which the valve is non-energized, is in communication with the pressure supply tank 3. Another master valve 25 is closed in the resting position.

Provided on each wheel VL, VR, HL, HR of the motor vehicle furnished with the brake system of the invention is a sensor S1–S4 formed, for example, as an inductive measured value sensor to feed the information on the rotational behavior of the wheel into an electronic control 38. The corresponding inputs of control 38 are designated by $E_S$. The said control contains, among other things, an electronic logical operation in the form of hardware or programable circuits such as micro-processors and, after evaluation of the sensor signals, generates control commands provided on outputs $A_1$–$A_6$ and HV and transported by way of signal lines (not shown) to the corresponding magnetic valves 4–9,24 and 25.

When putting the brake slip control into operation, both master valves 24 and 25 are re-switched thereby releasing a pressure medium path 26 leading from booster chamber 21 into pre-working chamber 23 to permit pressure medium to flow into the pre-working chamber 23. Connecting channels 27, 28 will cause the said pressure to be transported to annular chambers 29, 30 within the master cylinder arrangement 12. From these chambers, pressure will be dynamically supplied to working chambers 15, 16 by way of cup seals 31, 32 disposed circumferentially of pistons 42, 43 and acting as check valves, which working chambers are in communication with the wheel brakes of the front wheels.

The pressure medium admitted in dynamically controlled manner, at the same time, will cause a positioning sleeve 33 of the positioning means 13 to be set back so as to cause pistons 42, 43 to take, in known manner, a defined position in the master cylinder arrangement 12.

Owing to the dynamically controlled inflow of pressure medium into the static circuits of the front wheels VR, VL and into annular chamber 30 relevant of the reset pressure exerted on the positioning sleeve 33 even in the event of a frequent pressure decrease caused by the discharge of pressure medium by way of the re-switched valves 7 and 8, an "idle control" of the working chambers 15 and 16 will be prevented from occurring.

In the event of a failure of the auxiliary energy supply system 2 which, in that instance, comprise a pressure medium pump 34 along with the appertaining check valve 35 and a pressure medium storing tank 36, the pressure warning circuit (DSW) 37 will respond to report that condition to the electrical control 38 of the brake system and, depending on the level of the residual pressure, will result in the partial shut-down or cut-off of the brake slip control. Provision of the pressure warning switch 37 in the embodiment shown is important because the auxiliary energy in a normal, non-controlled deceleration is also used for boosting the brake force in the static circuits 17, 18 and for generating the brake pressure in the dynamic brake circuit 14. Defects in the dynamic pressure medium path within the brake pressure generator 1, for example, a defect in the booster chamber 21 or in the line 26, a leaky master valve 24 or a non-opening master valve 25 will be detected according to the present invention by path metering or position detection of the positioning sleeve 33. If a leakage or a defect in the pressure medium path prevents the inflow of dynamic pressure into the annular chamber 30, this with the brake slip control will result in a reduced volume of working chambers 15, 16 and in a substantial displacement of the positioning sleeve 33 to the left (as viewed in the drawing).

If the residual pressure medium volume in the front wheel circuits is at an excessively low value, the symbolically indicated mechanical switch 40 in the direction of the arrow opens the signal path by way of a contact 39 from the voltage source $U_B$ to terminal WU (path monitoring) and provides an error signal by way of input $E_2$ of the electronic control 38. This will partially shut down or completely cut off the brake system by way of the indicated outputs $A_1$–$A_6$ and HV leading to the switch valves 4–9 and to the master valves 24 and 25.

The relative position of the positioning sleeve 33 in the master cylinder arrangement 12 could also be indicated by an electrical or electromagnetic switch rather than by mechanical switch 40, to generate in the event of a failure, i.e. in the event of an excessively low reserve stroke, a warning signal and a cut-off signal. Moreover, it is possible to provide the master cylinder arrangement with a plurality of positioning switches in the form of path sensors thereby permitting (depending on the size of the residual reserve stroke) the release of different control functions. It is also possible for the system, in the first warning stage, to be rendered inoperative only in part or to delay the cut-off operation to the end of the already initiated controlled braking operation while in the event of an excessively low residual stroke, completely cutting off the brake slip control right away, for safety reasons, would have to be preferred. Depending on the special given conditions, a multiplicity of other variants is possible.

Owing to a combination of the path metering and the detection of the position of the positioning sleeve 33 in the master cylinder arrangement with other monitoring criteria such as pressure monitoring, the safety of the system can be further increased and a redundancy relative to the error detection be generated, respectively.

What is claimed is:

1. A slip-controlled brake system for motor vehicles having a brake pedal and comprising at least one static brake circuit into which, in the event of control, pressure medium from a dynamic pressure medium circuit is fed through a control valve, a brake pressure generator operably connected to said brake pedal and including a master cylinder arrangement including positioning means which during the dynamically controlled inflow of pressure medium into the static brake circuit is adapted to be moved to a first position wherein said positioning means is set back against the brake pedal force to maintain the master cylinder piston in a defined position, said positioning means also adapted to move to a second position responsive to the reduction of said pressure medium in said master cylinder, said system comprising a monitoring means (39, 40, WU) for detecting the relative position of said positioning means in the master cylinder arrangement (12), and means operably connected to the brake slip control system for evaluating the detected position of said positioning means whereby said brake slip control system is rendered substantially ineffective when said positioning means moves to said second position.

2. A brake system according to claim 8, wherein the positioning means (13) comprises a positioning sleeve (33) axially displaceable in the direction of movement of the master cylinder piston, with the position of the positioning sleeve (33) in the master cylinder arrangement (12) being detectable by mechanical path sensor means (40).

3. A brake system according to claim 2, wherein the path sensor means are formed as mechanically operable end switches (40) coupled to an electrical contact (39) closed in the resting position and during proper operation of the brake system.

4. A brake system according to claim 8, wherein the path sensor means (40) are formed as inductive position metering means.

5. A brake system according to claim 8, wherein the signals of the monitoring device (39, 30, WU) are logically coupled to the start signals of the slip control for the brake system.

6. A brake system according to claim 5, wherein the monitoring means (39, 40, WU) is in operation only in the event of a dynamically controlled feed of pressure medium and only during the brake slip control, respectively.

7. A brake system according to claim 2, wherein in the event of a failure the brake slip control can be turned off in whole or part in response to the relative position of the positioning means (13) and the positioning sleeve (33), respectively, in the master cylinder arrangement (12) as indicated by the monitoring means (39, 40, WU).

* * * * *